(12) United States Patent
Tatsumi

(10) Patent No.: US 8,140,875 B2
(45) Date of Patent: Mar. 20, 2012

(54) INTEGRATED CIRCUIT APPARATUS

(75) Inventor: Masahiro Tatsumi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 564 days.

(21) Appl. No.: 12/325,148

(22) Filed: Nov. 29, 2008

(65) Prior Publication Data

US 2009/0144571 A1   Jun. 4, 2009

(30) Foreign Application Priority Data

Nov. 30, 2007 (JP) ................................. 2007-310949

(51) Int. Cl.
*G06F 1/32* (2006.01)
(52) U.S. Cl. ........................................ 713/320; 710/260
(58) Field of Classification Search .......... 713/300–344; 710/260–269
See application file for complete search history.

(56) References Cited

U.S. PATENT DOCUMENTS

| | | | |
|---|---|---|---|
| 7,305,639 B2 * | 12/2007 | Floyd et al. .................. | 716/112 |
| 2002/0073348 A1 | 6/2002 | Tani | |
| 2006/0075267 A1 * | 4/2006 | Tokue .......................... | 713/300 |
| 2008/0178030 A1 | 7/2008 | Koizumi | |

FOREIGN PATENT DOCUMENTS

| | | |
|---|---|---|
| JP | 7-141074 A | 6/1995 |
| JP | 2002-182807 A | 6/2002 |
| JP | 2006-107127 | 4/2006 |
| JP | 2006-237189 | 9/2006 |
| JP | 2007-079881 A | 3/2007 |
| JP | 2008-181329 A | 8/2008 |

OTHER PUBLICATIONS

Japanese Office Action dated Aug. 2, 2011 for corresponding Japanese Application No. 2007-310949, with Partial English Translation.

* cited by examiner

*Primary Examiner* — Brian Misiura
*Assistant Examiner* — Kim Huynh
(74) *Attorney, Agent, or Firm* — Fujitsu Patent Center

(57) ABSTRACT

An integrated circuit apparatus may include: a plurality of power domains to which power voltage is separately supplied; a plurality of circuit macros belonging to a plurality of the power domains respectively; a plurality of power switches to conduct or to substantially block power coming from a power circuit and going to the plurality power domains, respectively; and a power-controlling unit including a controller to control the plurality of power switches, a power domain register to store power domain data which corresponds to a plurality of external interrupt signals that are indicative of power domains that are to be activated; and an interrupt handler to respond to the external interrupt signals by delivering the power domain data corresponding to the external interrupt signals to the controller, the controller being operable to turn on/off the power switches corresponding to the power domain data, respectively.

12 Claims, 14 Drawing Sheets

| 4 | APPLICATION PERIPHERAL CIRCUIT | APPLICATION CPU | MEMORY | COMMUNICATION PERIPHERAL CIRCUIT | COMMUNICATION CPU |
|---|---|---|---|---|---|
| DOMAIN REGISTER R1 (s1) | ON | ON | ON | ON | ON |
| DOMAIN REGISTER R2 (s2) | OFF | OFF | ON | ON | ON |
| DOMAIN REGISTER R3 (s3) | ON | ON | OFF | OFF | OFF |

| R1,R2,R3 | APPLICATION PERIPHERAL CIRCUIT | APPLICATION CPU | MEMORY | COMMUNICATION PERIPHERAL CIRCUIT | COMMUNICATION CPU |
|---|---|---|---|---|---|
| DOMAIN REGISTER R1 (s1) | ON | ON | ON | ON | ON |
| DOMAIN REGISTER R2 (s2) | OFF | OFF | ON | ON | ON |
| DOMAIN REGISTER R3 (s3) | ON | ON | OFF | OFF | OFF |

| SR | APPLICATION PERIPHERAL CIRCUIT | APPLICATION CPU | MEMORY | COMMUNICATION PERIPHERAL CIRCUIT | COMMUNICATION CPU |
|---|---|---|---|---|---|
| SEQUENCE REGISTER | 4h | 5h | 2h | 1h | 3h |

FIG. 14A

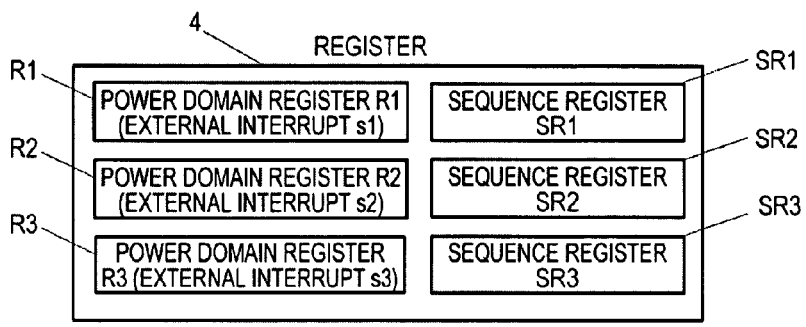

FIG. 14B

| R1,R2,R3 | APPLICATION PERIPHERAL CIRCUIT | APPLICATION CPU | MEMORY | COMMUNICATION PERIPHERAL CIRCUIT | COMMUNICATION CPU |
|---|---|---|---|---|---|
| DOMAIN REGISTER R1 (s1) | ON | ON | ON | ON | ON |
| DOMAIN REGISTER R2 (s2) | OFF | OFF | ON | ON | ON |
| DOMAIN REGISTER R3 (s3) | ON | ON | OFF | OFF | OFF |

FIG. 14C

| SR | APPLICATION PERIPHERAL CIRCUIT | APPLICATION CPU | MEMORY | COMMUNICATION PERIPHERAL CIRCUIT | COMMUNICATION CPU |
|---|---|---|---|---|---|
| SEQUENCE REGISTER SR1 | 4h | 5h | 2h | 1h | 3h |
| SEQUENCE REGISTER SR2 |  |  | 2h | 1h | 3h |
| SEQUENCE REGISTER SR3 | 1h | 2h |  |  |  |

INTEGRATED CIRCUIT APPARATUS

CROSS-REFERENCE TO RELATED APPLICATIONS

This application claims the benefit of priority from Japanese Patent Application No. 2007-310949 filed on Nov. 30, 2007, which is herein incorporated by reference in its entirety.

BACKGROUND

1. Field

Embodiments of the present invention relate to a semiconductor integrated circuit apparatus including a power-controlling unit that controls power for a plurality of power domains.

2. Description of Related Art

A semiconductor integrated circuit ("IC"), e.g., a LSI IC, VLSI IC, etc., may incorporate a plurality of circuit macros (or IP macros or proprietary macros), where the term "macro" designates a circuit arranged for a particular function. Furthermore, such an IC may be provided with a plurality of power domains (power areas) to save power consumption, and a power-controlling unit to power-control a plurality of the circuit macros belonging to the different power domains. It is not necessary for all the circuit macros to be energized at all times. Power can be saved by selectively turning on/off power to the power domain to which a given circuit macro(s) belongs, according to a condition of a requested process.

Methods which control the supply of power to a circuit macro in a system LSI are described in Japanese laid open No. 2006-107127 and Japanese laid open No. 2006-237189.

In Japanese laid open No. 2006-107127, the power-controlling unit in the system LSI responds to an external interrupt signal to read a command sequence stored in a memory. Next, the power-controlling unit causes a power IC to control the activation of a power circuit of the circuit macro in the system LSI. Thereby, the power-controlling unit can supply the power only to the power area which needs to operate.

In Japanese laid open No. 2006-237189, the power-controlling unit in the system LSI includes a power control register storing a bit for controlling to supply and block the power for each IP macro. An interrupt controller responds to an interrupt from the IP macro to output a power control signal to the power-controlling unit, and causes the power-controlling unit to control the power block to the IP macro according to a result of the comparison with the power control register. When the power is supplied, the interrupt controller outputs the power control signal to the power-controlling unit to cause the power-controlling unit to control the power supply to the IP macro.

SUMMARY

At least one embodiment of the present invention provides an integrated circuit apparatus that includes: a plurality of power domains to which power voltage is separately supplied; a plurality of circuit macros belonging to a plurality of the power domains respectively; a plurality of power switches to conduct or to substantially block power coming from a power circuit and going to the plurality power domains, respectively; and a power-controlling unit including a controller to control the plurality of power switches, a power domain register to store power domain data which corresponds to a plurality of external interrupt signals that are indicative of power domains that are to be activated; and an interrupt handler to respond to the external interrupt signals by delivering the power domain data corresponding to the external interrupt signals to the controller, the controller being operable to turn on/off the power switches corresponding to the power domain data, respectively.

Features and advantages of embodiments of the present invention will be apparent from the detailed specification and, thus, are intended to fall within the scope of the appended claims. Further, because numerous modifications and changes will be apparent to those skilled in the art based on the description herein, it is not desired to limit the embodiments of the present invention to the exact construction and operation illustrated and described, and accordingly all suitable modifications and equivalents are included.

BRIEF DESCRIPTION OF THE DRAWINGS

Embodiments are illustrated by way of example and not limited by the following figures.

FIGS. 14A, 14B and 14C also are detailed configuration diagrams of a power domain register according to an example of an embodiment of the present invention.

DETAILED DESCRIPTION OF THE EXAMPLE EMBODIMENTS

Figure 1:
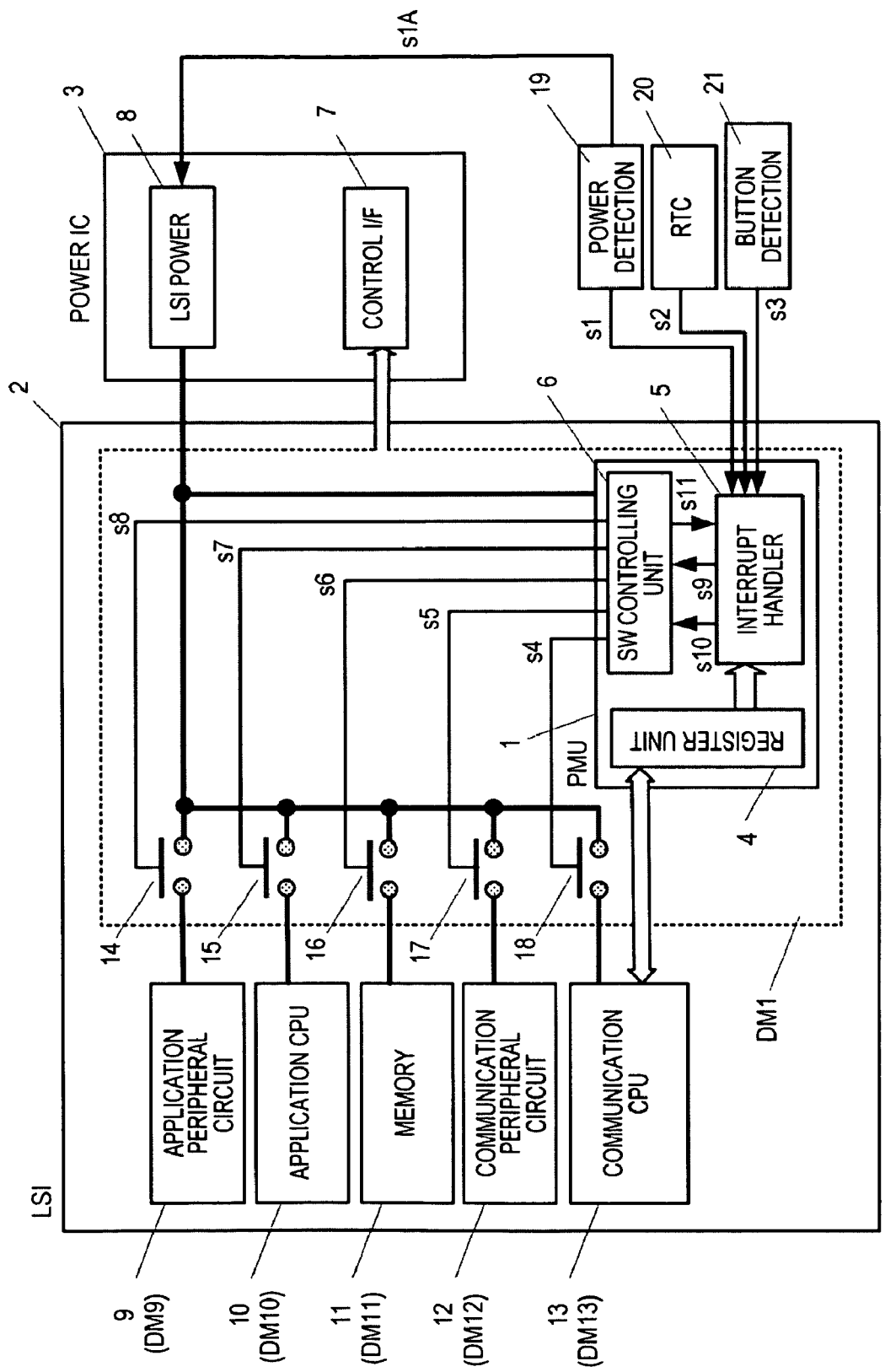
FIG. 1 is a diagram illustrating a configuration of a semiconductor integrated circuit according to an example of an embodiment of the present invention.

In the figures, dimensions and/or proportions may be exaggerated for clarity of illustration. It will also be understood that when an element is referred to as being "connected to"

another element, it may be directly connected or indirectly connected, i.e., intervening elements may also be present. Further, it will be understood that when an element is referred to as being "between" two elements, it may be the only element layer between the two elements, or one or more intervening elements may also be present. Like reference numerals refer to like elements throughout.

Examples of embodiments will be described below with reference to the drawings.

FIG. 1 is a diagram illustrating a configuration of a semiconductor integrated circuit (hereinafter, referred to as a system LSI as a specific example). FIG. 1 illustrates a system LSI 2, a power IC 3 supplying the power to the system LSI 2, and a power detecting circuit 19, a timer circuit 20, and a control button detecting circuit 21 which delivers external interrupt signals s1, s2, and s3 respectively. This example assumes, for the sake of illustration, a configuration of a portable phone.

The power detecting circuit 19 detects turn-on and turn-off of power switches in the entire portable phone to generate the external interrupt signal s1. The timer circuit 20 generates the external interrupt signal s2 every determined time to check a communication condition. The control button detecting circuit 21 detects such a fact that a control button other than the power switch is pushed to generate the external interrupt signal s3. A plurality of the external interrupt signals s3 may be generated as corresponding to a plurality of the control buttons.

The power IC 3 responds to a power start signal s1A, which is outputted by the power detecting circuit 19 in response to turn-on of the power switches in the entire portable phone, activates a LSI power circuit 8, and outputs the resulting power voltage to a power wiring PWL. A control interface 7 in the power IC 3 responds to the control from a CPU in the system LSI 2 or a power-controlling unit 1 to control the LSI power circuit 8 in the power IC 3.

The system LSI 2 includes a plurality of power domains DM 1, and DM 9 to DM 13, in which the power domain DM 1 is connected to the power wiring PWL, and when the LSI power circuit 8 is activated, the power domain DM 1 is continually supplied with power. The power domains DM 9 to DM 13 are provided with different circuit macros respectively. The circuit macros are connected to the power wiring PWL through power switches 14 to 18. The circuit macros belonging to the power domains DM 9 to DM 13 are, for example, an application peripheral circuit 9, an application CPU 10, a memory 11, a communication peripheral circuit 12, and a communication CPU 13. The communication CPU 13 mainly executes communication control along with the communication peripheral circuit 12. The application CPU 10 mainly controls a variety of applications other than the communication control along with the application peripheral circuit 9.

The power-controlling unit (or power management unit ("PMU") 1, and the power switches 14 to 18 belong to the power domain DM 1 to which power is continually supplied. Thus, after the power detecting circuit 19 detects that the portable phone is totally turned on, power is continually supplied from the LSI power circuit 8 to the power-controlling unit 1 through the power wiring PWL. The power-controlling unit 1 responds to the external interrupt signal s1 from the power detecting circuit 19 when power initially is started to be fed, the external interrupt signal s2 from the timer circuit 20, and the external interrupt signal s3 from the control button detecting circuit 21, and executes a desired, if not optimum, control for each of the external interrupt signals for a plurality of the power domains DM 9 to DM 13.

The power-controlling unit 1 includes a power switch controlling unit 6, a power domain memory, e.g., a register, 4, and an interrupt handling unit ("handler") 5. The power switch controlling unit 6 controls the power switches 14 to 18. The power domain register 4 stores data of the power domain to be activated as corresponding to a plurality of the external interrupt signals s1 to s3. The interrupt handler 5 responds to the external interrupt signals s1 to s3 to deliver the power domain data corresponding to the external interrupt signals to the power switch controlling unit 6. The interrupt handler 5 responds to the external interrupt signal, reads the power domain data corresponding to the external interrupt signal from the power domain register 4, and delivers a start timing signal s9 and a power domain signal s10 including the power domain data to the power switch controlling unit 6. The power switch controlling unit 6 responds to the start timing signal s9, can turn on/off the power switch corresponding to the power domain data included in the power domain signal s10, and outputs a termination timing signal s11 to the interrupt handler 5 after it is completed to turn on/off the power switch. Thereby, the interrupt handler 5 terminates to control the power interrupts corresponding to the external interrupt signals s1 to s3.

The communication CPU 13 and the application CPU 10 request the power-controlling unit 1 to turn on and turn off the power switches 14 to 18. The communication CPU 13 and the application CPU 10, through the power-controlling unit 1 or directly, instruct the control interface 7 in the power IC 3 to block power to the LSI power circuit 8 and to change the power voltage (increasing the voltage or decreasing the voltage) of the LSI power circuit 8. The control interface 7 responds to the instruction to control the LSI power circuit 8. The LSI power circuit 8 is configured with a power regulation circuit.

Figures 2A, 2B:
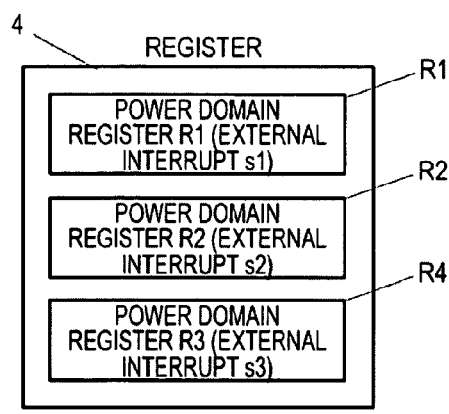
FIGS. 2A and 2B are detailed configuration diagrams of a power domain register according to an example of an embodiment of the present invention.

FIGS. 2A and 2B detailed configuration diagrams of the power domain register 4. As illustrated in FIG. 2A, the power domain register 4 includes power domain registers R1, R2, and R3 corresponding to the external interrupt signals s1, s2, and s3 respectively. As illustrated in FIG. 2B, each of the registers R1, R2, and R3 stores the power domain data indicating the circuit macro to be activated in the circuit macros belonging to a plurality of the power domains DM 9 to DM 13. The circuit macros belonging to a plurality of the power domains DM 9 to DM 13 correspond to an application peripheral circuit, an application CPU, a memory, a communication peripheral circuit, and a communication CPU. In the example of FIG. 2B, the register R1 corresponding to the external interrupt signal s1 stores the power domain data related to turning on power to the application peripheral circuit, the application CPU, the memory, the communication peripheral circuit, and the communication CPU, respectively. The register R2 corresponding to the external interrupt signal s2 stores the power domain data related to turning on power to the memory, the communication peripheral circuit, and the communication CPU, respectively. The register R3 corresponding to the external interrupt signal s3 stores the power domain data related to turning on power to the application peripheral circuit, the application CPU, respectively.

Figure 3:
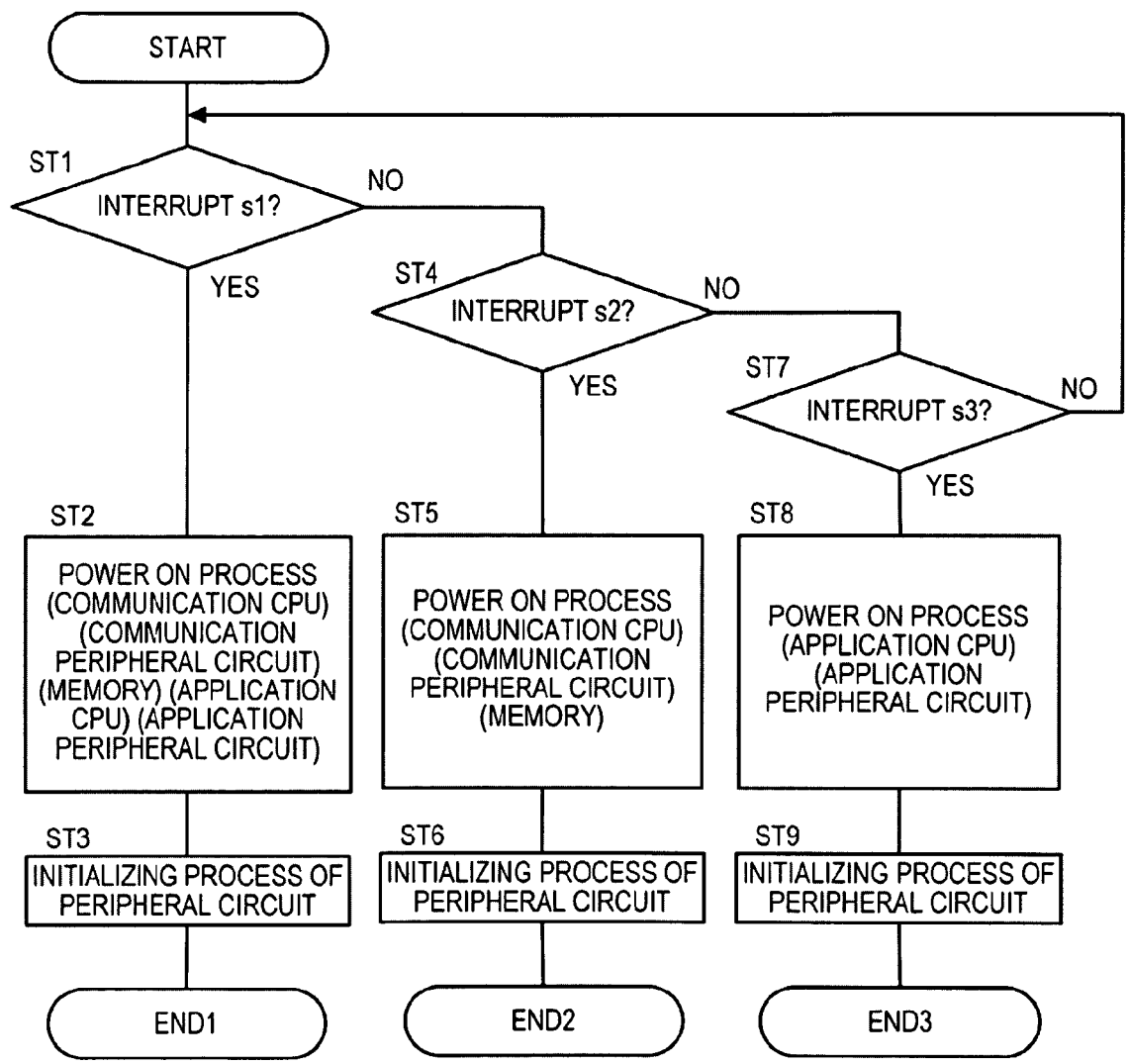
FIG. 3 is a flowchart diagram illustrating an interrupt process of a power-controlling unit according to an example of an embodiment of the present invention.

FIG. 3 is a flowchart diagram illustrating an interrupt process of the power-controlling unit PMU. In response to the external interrupt signal s1 from the power detecting circuit 19 (YES at ST 1), the power-controlling unit 1 executes a process for turning on power to the power domains corresponding to the power domain data of the register R1 (ST 2). After that, an initializing process of the peripheral circuit is executed (ST 3).

Figure 4:
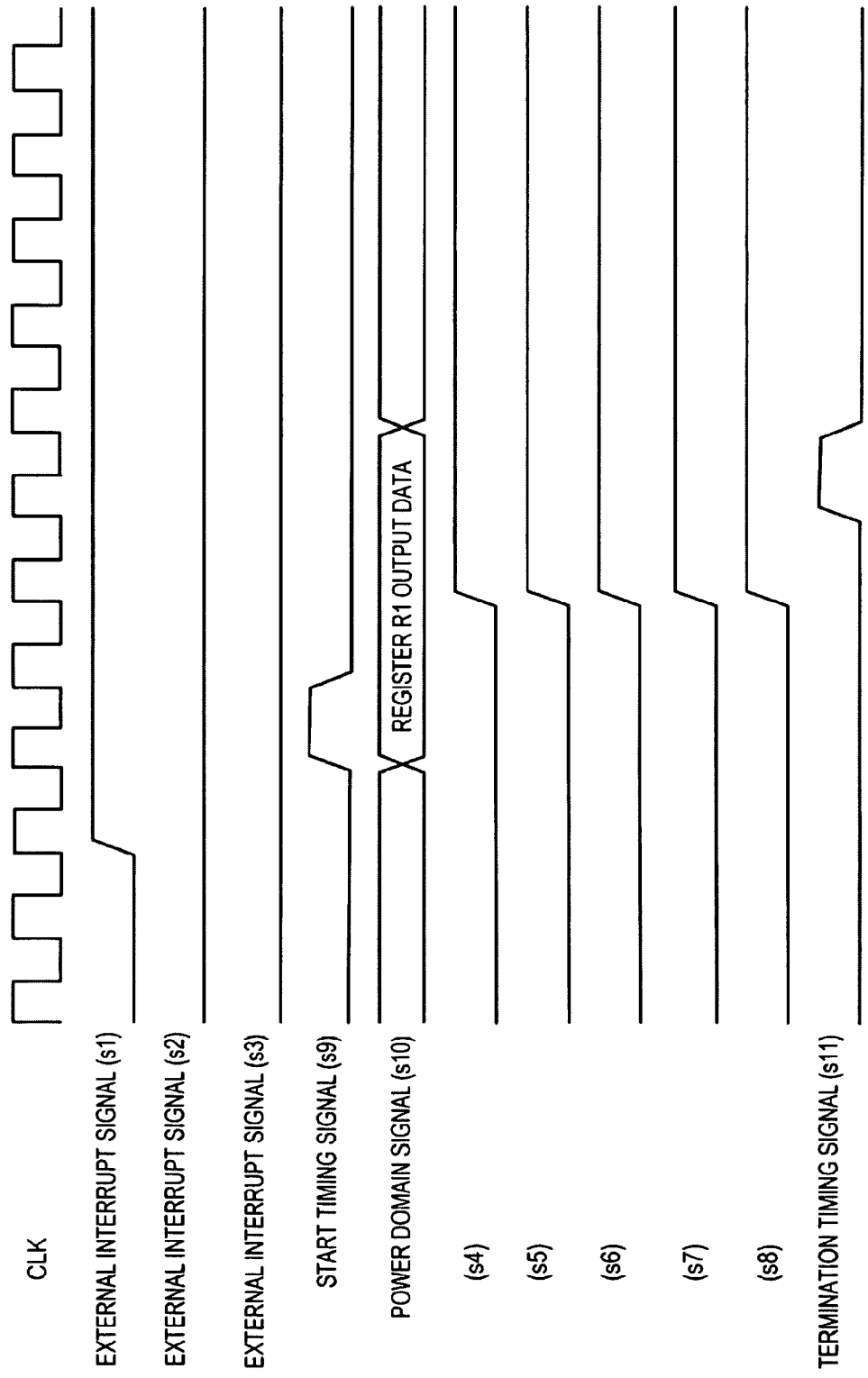
FIG. 4 is a signal wave diagram of a power-controlling unit PMU for an external interrupt signal s1 according to an example of an embodiment of the present invention.

FIG. 4 is a signal wave diagram of the power-controlling unit PMU for the external interrupt signal s1. When the external interrupt signal s1 becomes an H level, the interrupt handler 5 reads the power domain data of the register R1. Next, the interrupt handler 5 outputs the power domain signal s10 including the power domain data and the start timing signal s9 to the power switch controlling unit 6. In response to the start timing signal s9, the power switch controlling unit 6 causes the power switch control signals s4, s5, s6, s7, and s8 to be the H level. Thus, the power switches 14 to 18 are turned on. The power switch controlling unit 6 can turn on the power switches to output the termination timing signal s11 to the interrupt handler 5, and the interrupt handler 5 terminates to control the interrupt.

The circuit macro of each power domain, which is activated, executes an initializing process (ST 3). Each circuit macro executes an interrupt process corresponding to the external interrupt. After each circuit macro executes the such processes, the CPUs 10 and 13 arbitrarily output a request for turning off the power to the power-controlling unit 1. The power switch controlling unit 6 of the power-controlling unit 1 turns off the power switches of the power domains DM 9 to DM 13 of the circuit macros in which it becomes unnecessary to supply power.

Returning to FIG. 3, in response to the external interrupt signal s2 from the timer circuit 20 (YES at ST 4), the power-controlling unit 1 executes a process for turning on the power domain corresponding to the power domain data of the register R2 (ST 5). After that, the initializing process of the peripheral circuit is executed (ST 6). The timer circuit 20 outputs the external interrupt signal s2 in each cycle for confirming whether or not a portable phone terminal includes an incoming message. Thus, in response to the external interrupt signal s2, the system LSI 2 activates the communication CPU 13, the communication peripheral circuit 12, and the memory 11.

Figure 5:
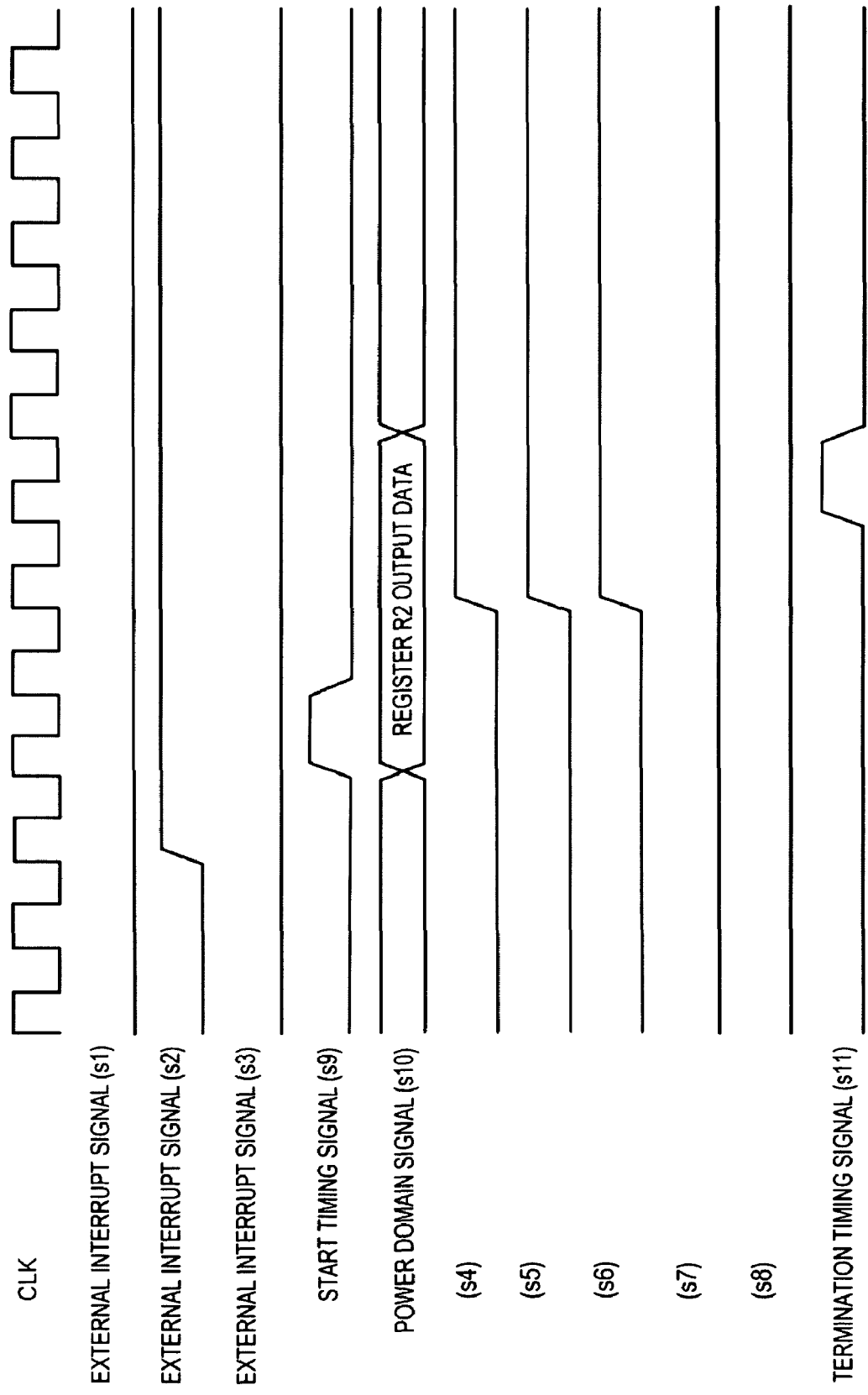
FIG. 5 is a signal wave diagram of the power-controlling unit PMU for an external interrupt signal s2 according to an example of an embodiment of the present invention.

FIG. 5 is a signal wave diagram of the power-controlling unit PMU for the external interrupt signal s2. When the external interrupt signal s2 becomes the H level, the interrupt handler 5 reads the power domain data of the register R2. Next, the interrupt handler 5 outputs the power domain signal s10 including the power domain data and the start timing signal s9 to the power switch controlling unit 6. In response to the start timing signal s9, the power switch controlling unit 6 causes the power switch control signals s4, s5, and s6 to be the H level. Thus, the power switches 18, 17, and 16 are turned on. The power switch controlling unit 6 can turn on the power switches to output the termination timing signal s11 to the interrupt handler 5, and the interrupt handler 5 terminates to control the interrupt.

The circuit macro of each power domain, which is activated, executes an initializing process (ST 6). Each circuit macro executes an interrupt process corresponding to the external interrupt. After each circuit macro executes such processes, the communication CPU 13 arbitrarily outputs a request for turning off the power to the power-controlling unit 1. The power switch controlling unit 6 of the power-controlling unit 1 turns off the power switches 16, 17, and 18 of the power domains DM 11, 12, and 13 of the circuit macros in which it becomes unnecessary to supply power.

Returning to FIG. 3, in response to the external interrupt signal s3 from the control button detecting circuit 21 (YES at ST 7), the power-controlling unit 1 executes a process for turning on the power domain corresponding to the power domain data of the register R3 (ST 8). After that, the initializing process of the peripheral circuit is executed (ST 9). The timer circuit 20 detects that a control button of the portable phone terminal is operated to cause the external interrupt signal s3 to be the H level. Thus, in response to the external interrupt signal s3, the system LSI 2 activates the application CPU 10 and the application peripheral circuit 9. This application corresponds to, for example, the registering for a phone book, the browsing for a memo pad, and the like.

Figure 6:
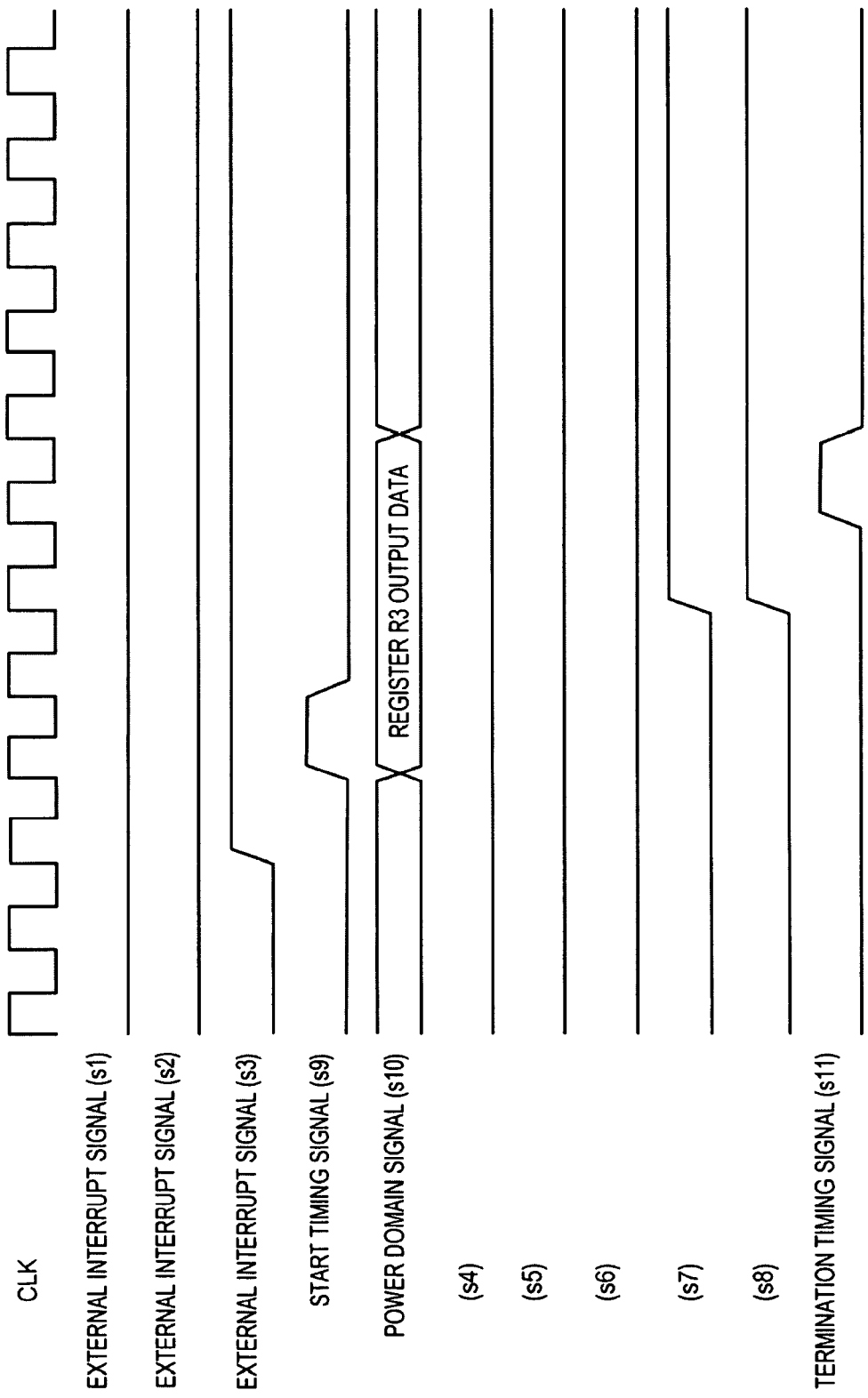
FIG. 6 is a signal wave diagram of the power-controlling unit PMU for an external interrupt signal s3 according to an example of an embodiment of the present invention.

FIG. 6 is a signal wave diagram of the power-controlling unit PMU for the external interrupt signal s3. When the external interrupt signal s3 becomes the H level, the interrupt handler 5 reads the power domain data of the register R3. Next, the interrupt handler 5 outputs the power domain signal s10 including the power domain data and the start timing signal s9 to the power switch controlling unit 6. In response to the start timing signal s9, the power switch controlling unit 6 causes the power switch control signals s7 and s8 to be the H level. Thus, the power switches 15, and 14 are turned on. The power switch controlling unit 6 can turn on the power switches to output the termination timing signal s11 to the interrupt handler 5, and the interrupt handler 5 terminates to control the interrupt.

The circuit macro of each power domain, which is activated, executes an initializing process (ST 9). Each circuit macro executes an interrupt process corresponding to the external interrupt. After each circuit macro executes such processes, the application CPU 10 arbitrarily outputs a request for turning off the power to the power-controlling unit 1. The power switch controlling unit 6 of the power-controlling unit 1 turns off the power switches 14 and 15 of the power domains DM 9 and 10 the circuit macros in which it becomes unnecessary to supply the power.

Figure 7:
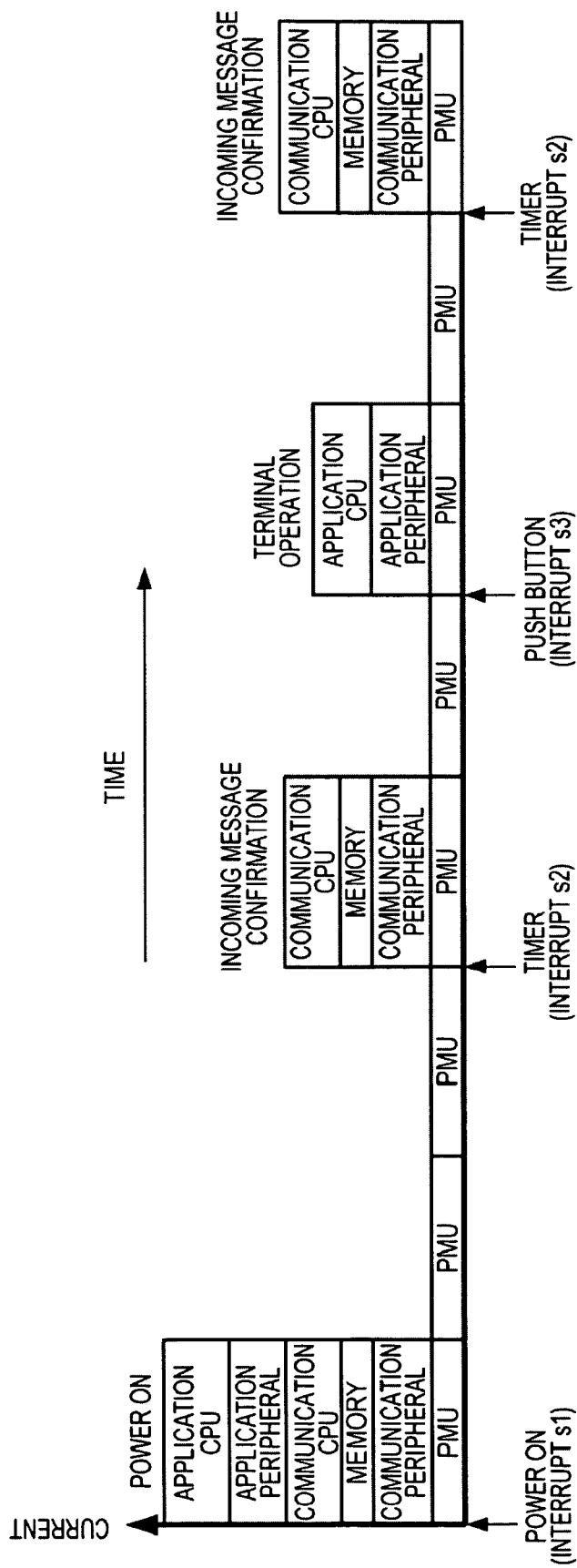
FIG. 7 is a diagram illustrating a power control scheme according to an example of an embodiment of the present embodiment.

FIG. 7 is a diagram illustrating an a power control scheme. A horizontal axis is a time, and a vertical axis is consumption current of the system LSI 2. From the left side of FIG. 7, when the power switch of the portable phone terminal is turned on, the external interrupt signal s1 is induced, and the LSI power circuit 8 of the power IC 3 is activated. Thereby, the voltage of the power wiring PWL in the system LSI 2 is increased, and the power domain, to which the power-controlling unit 1 belongs, is activated. Consequently, the power-controlling unit 1 responds to the external interrupt signal s1 to turn on all the power switches 14 to 18. All the circuit macros 9 to 13 may execute an initializing operation accompanying to the activation. For example, the communication CPU 13 and the communication peripheral circuit 12 establish the communication with the base station to register the position of the portable phone terminal. The application CPU 10 and the application peripheral circuit 9 execute the initializing operation for the application such as downloading data.

After that, the CPUs 10 and 13 request the power-controlling unit 1 to turn off power to the circuit macros 9 to 13, and the power-controlling unit 1 turns off the power switches 14 to 18. However, since the power circuit 8 in the power IC 3 continues to supply the power wiring PWL with the power voltage, the power domain DM 1, to which the power-controlling unit 1 belongs, remains to be turned on. Thus, the consumption current of the power-controlling unit PMU is continuously generated.

Next, when the timer circuit 20 generates the external interrupt signal s2 to confirm the incoming message, as described above, the power-controlling unit 1 can turn on the power switches 18, 17, and 16 of the power domains DM 13, DM 12, and DM 11 of the communication CPU 13, the communication peripheral circuit 12, and the memory 11. Thereby, the communication CPU 13, the communication peripheral circuit 12, and the memory 11 may execute operations for confirming the incoming message to consume the current. When a series of operations are completed, the communication CPU 13 outputs a request for turning off the power switches 18, 17, and 16 to the power-controlling unit 1. Thus, the power-controlling unit 1 can turn off such switches. As a result, only the power-controlling unit PMU becomes to be on a current-consuming condition.

Next, when the control button of the portable phone terminal is operated, the control button detecting circuit 21 generates the external interrupt signal s3. In response to such an operation, the power-controlling unit 1 can turn on the power switches 15 and 14 of the power domains DM 10 and DM 9 to which the application CPU 10 and the application peripheral circuit 9 belong respectively. Thereby, the application CPU 10 and the application peripheral circuit 9 may execute desired application processes. After the processes, the CPU 10 request the power-controlling unit 1 to turn off the circuit macros 9 and 10, and the power-controlling unit 1 turns off the power switches 14 and 15. Thus, the consumption current of the power-controlling unit PMU is continuously generated.

FIG. 7 further illustrates that, when the timer circuit 20 generates the external interrupt signal s2 to confirm the incoming message, the power switches 18, 17, and 16 of the communication CPU 13, the communication peripheral circuit 12, and the memory 11 are controlled to be turned on, and the current is consumed in such circuit macros.

As described above, when the entire portable phone terminal is powered on (external interrupt signal s1), the power-controlling unit 1 activates the power domains of all the circuit macros. After the circuit macros execute the initial operations and power-on operations, the power-controlling unit can turn off the power domains of all the circuit macros other than the power-controlling unit PMU. For the other external interrupt signals s2 and s3, the power-controlling unit 1 activates the appropriate circuit macros according to the power domain data of the power domain register 4. After the circuit macros execute the desired operations, the power-controlling unit can turn off such circuit macros. After that, the power continually supplied to the power-controlling unit PMU. As described above, the power-controlling unit 1 controls the activation of the different combinations of the circuit macros according to the external interrupts s1, s2, and s3 including the time of power-on. Thus, the power-controlling unit 1 includes the power domain register 4 storing the power domain data of the circuit macro to be activated, and the interrupt handler 5.

The preceding discussion notwithstanding, four or more kinds of the external interrupt signals may exist, and the power domain register may store the power domain data corresponding to each of the external interrupt signals.

Figure 8:
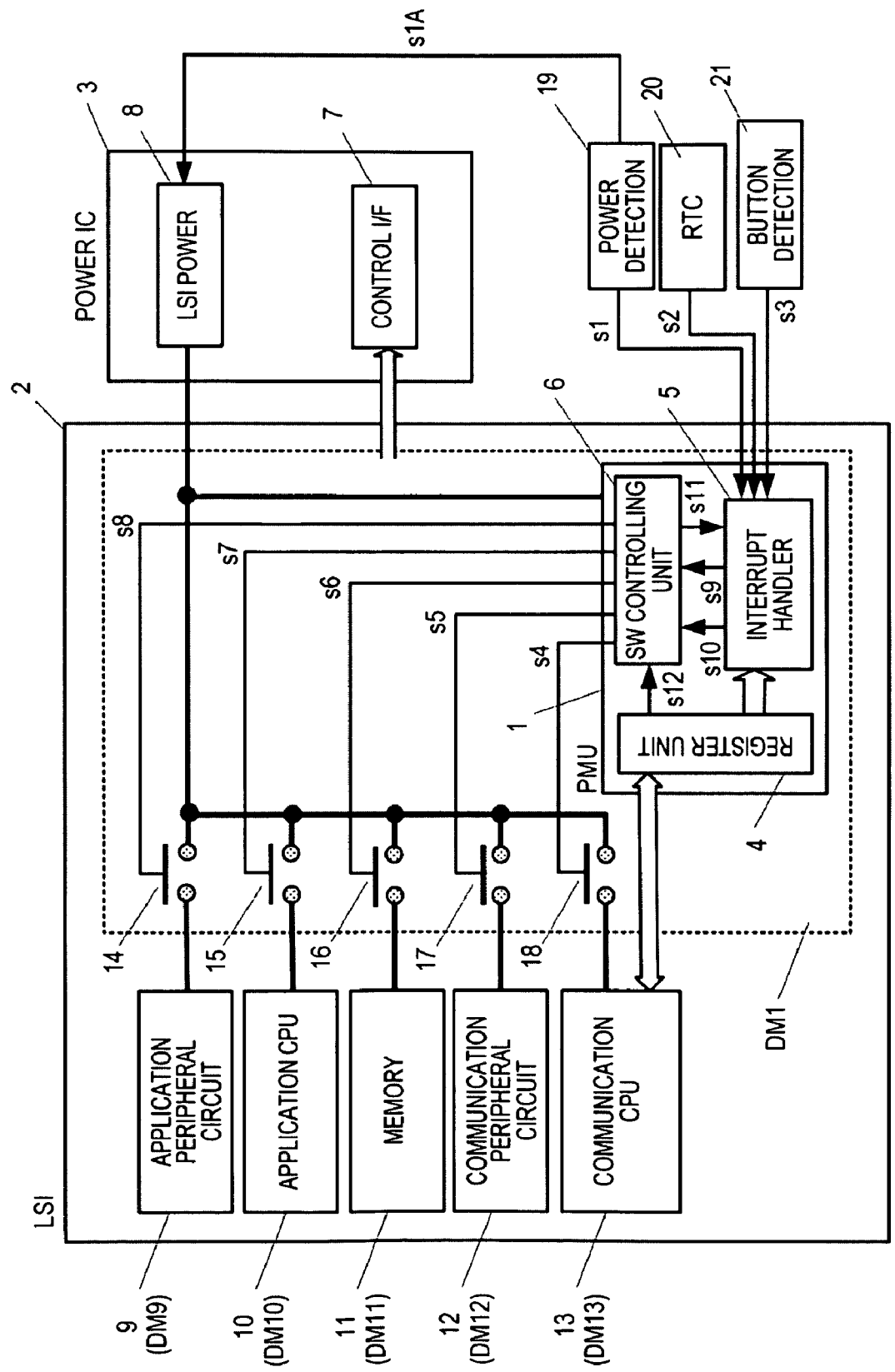
FIG. 8 also is a diagram illustrating a configuration of a semiconductor integrated circuit according to an example of an embodiment of the present invention.

FIG. 8 is a diagram illustrating a configuration of the semiconductor integrated circuit. As in FIG. 1, FIG. 8 illustrates the system LSI 2, the power IC 3 supplying the power to the system LSI 2, the power detecting circuit 19, the timer circuit 20, and the control button detecting circuit 21 which deliver the external interrupt signals s1, s2, and s3 respectively. The point which is different from FIG. 1 is that power start sequence data is stored in the power domain register 4 in the power-controlling unit 1 in addition to data of a power domain which should be activated as corresponding to the external interrupt signals s1, s2, and s3. And a power sequence signal s12 is outputted from the register 4 to the power switch controlling unit 6. Other points are similar to or the same as FIG. 1, and their discussion will not be repeated here for the sake of brevity.

Figures 9A, 9B, 9C:
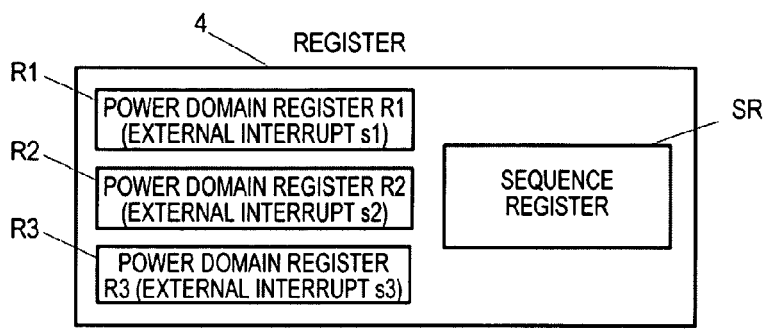
FIGS. 9A, 9B and 9C also are detailed configuration diagrams of a power domain register according to an example of an embodiment of the present invention.

FIGS. 9A, 9B and 9C are a detailed configuration diagram of the power domain register 4. In FIG. 9A, the power domain register 4 includes a sequence register SR in addition to the power domain registers R1, R2, and R3. As illustrated in FIG. 9B, the power domain registers R1, R2, and R3 store the power domain data indicating the circuit macro to be activated corresponding to the external interrupt signals s1, s2, and s3. The function of the power domain registers R1, R2, and R3 is the same as that of FIG. 2B. In addition, as illustrated in FIG. 9C, the sequence register SR stores order data of a power start sequence of the power domains of a plurality of the circuit macros. According to the example of FIG. 9C, a start sequence for activating all the circuit macros in the system LSI is as follows: the communication peripheral circuit, the memory, the communication CPU, the application peripheral circuit, and the application CPU.

Thus, when the external interrupt signal s1 is induced, for the circuit macros whose power domain data is ON in the power domain register R1, that is, all the circuit macros 9 to 13, the power switches of the power domains are controlled to be turned on in the sequence order indicated by the order data in the sequence register SR. When the external interrupt signal s2 is induced, for the memory, the communication peripheral circuit, and the communication CPU, whose power domain data is ON in the power domain register R2, the power switches of the power domains are controlled to be turned on in the sequence order indicated by the order data in the sequence register SR. When the external interrupt signal s3 is induced, for the application peripheral circuit and the application CPU, whose power domain data is ON in the power domain register R3, the power switches of the power domains are controlled to be turned on in the sequence order indicated by the order data in the sequence register SR.

It may be desirable to activate a plurality of the circuit macros in the system LSI 2 in according to a given power sequence. Between the circuit macros, a plurality of signal wirings are provided which output and input signals from one side to the other side, and from the other side to one side. It may be desirable to activate the circuit macro in a signal-outputting side earlier than the circuit macro in a signal-inputting side. This is because, if the circuit macro in the signal-outputting side is activated earlier, it is possible to reduce the chances of, if not prevent, the outputted signal from becoming an unstable level, and to reduce the chances of, if not prevent, the circuit macro in the signal-inputting side from malfunctioning. Thus, generally, a circuit, which clamps an output signal level to the H or L level at the time of the activation, is provided to the signal wiring, whose direction is reverse to the order of the power sequence, so that the signal does not become unstable.

According to the power start sequence data stored in the sequence register SR of FIG. 9, on such a condition that the communication peripheral circuit 12, the memory 11, the communication CPU 13, the application peripheral circuit 9, and the application CPU 10 are activated in this order, the above clamping circuit is provided between the circuit macros. Thus, when a part or all of the circuit macros are activated in response to the external interrupt signals s1, s2, and s3, it may be desirable to maintain the above power sequence order.

Figure 10:
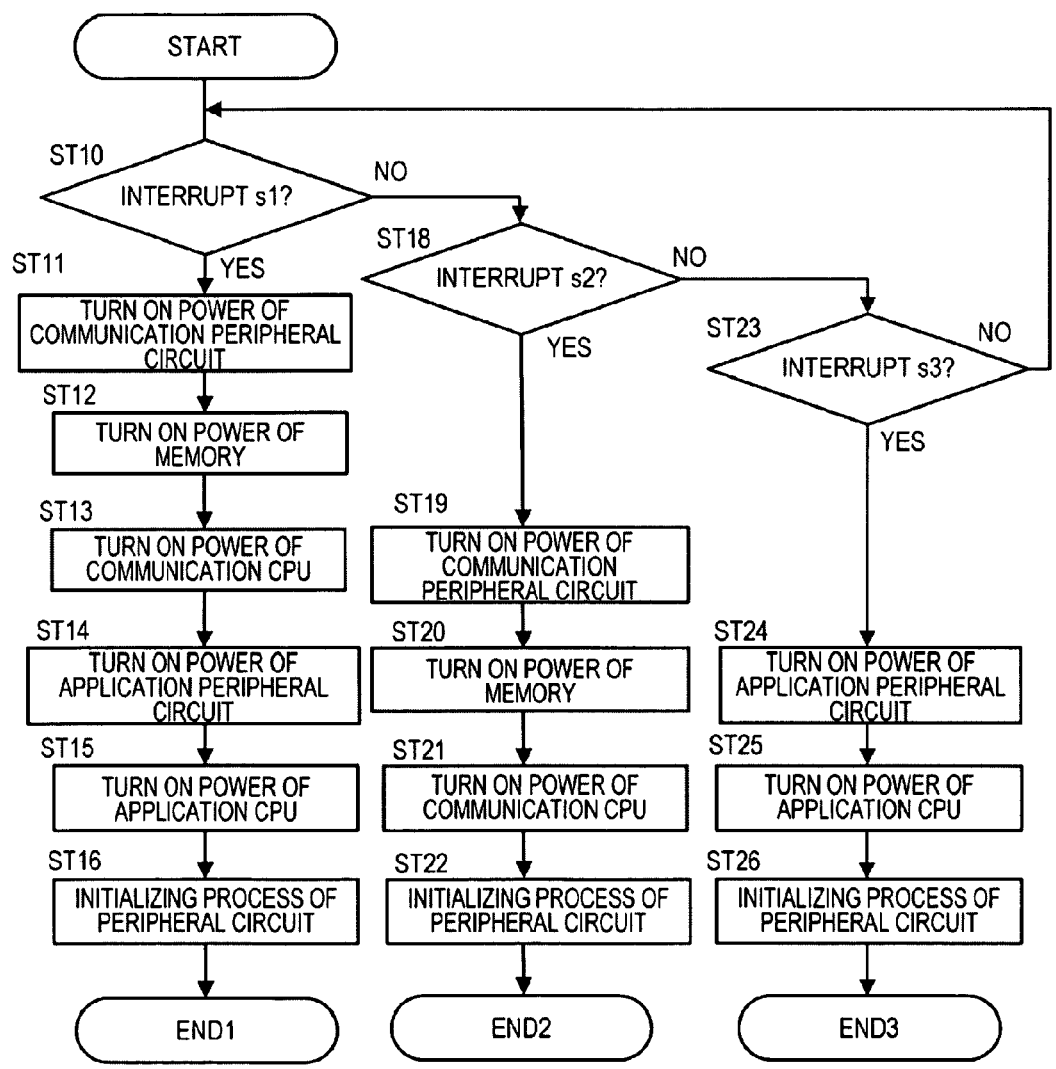
FIG. 10 also is a flowchart illustrating the interrupt process of the power-controlling unit according to an example of an embodiment of the present invention.

FIG. 10 is a flowchart illustrating the interrupt process of the power-controlling unit PMU. When the external interrupt signal s1 is induced (YES at ST 10), the power-controlling unit 1 controls the power start sequence corresponding to the external interrupt signal s1 (ST 11 to ST 16), when the external interrupt signal s2 is induced (YES at ST 18), the power-controlling unit 1 controls the power start sequence corresponding to the external interrupt signal s2 (ST 19 to ST 22), and when the external interrupt signal s3 is induced (YES at ST 23), the power-controlling unit 1 controls the power start sequence corresponding to the external interrupt signal s3 (ST 24 to ST 26).

Figure 11:
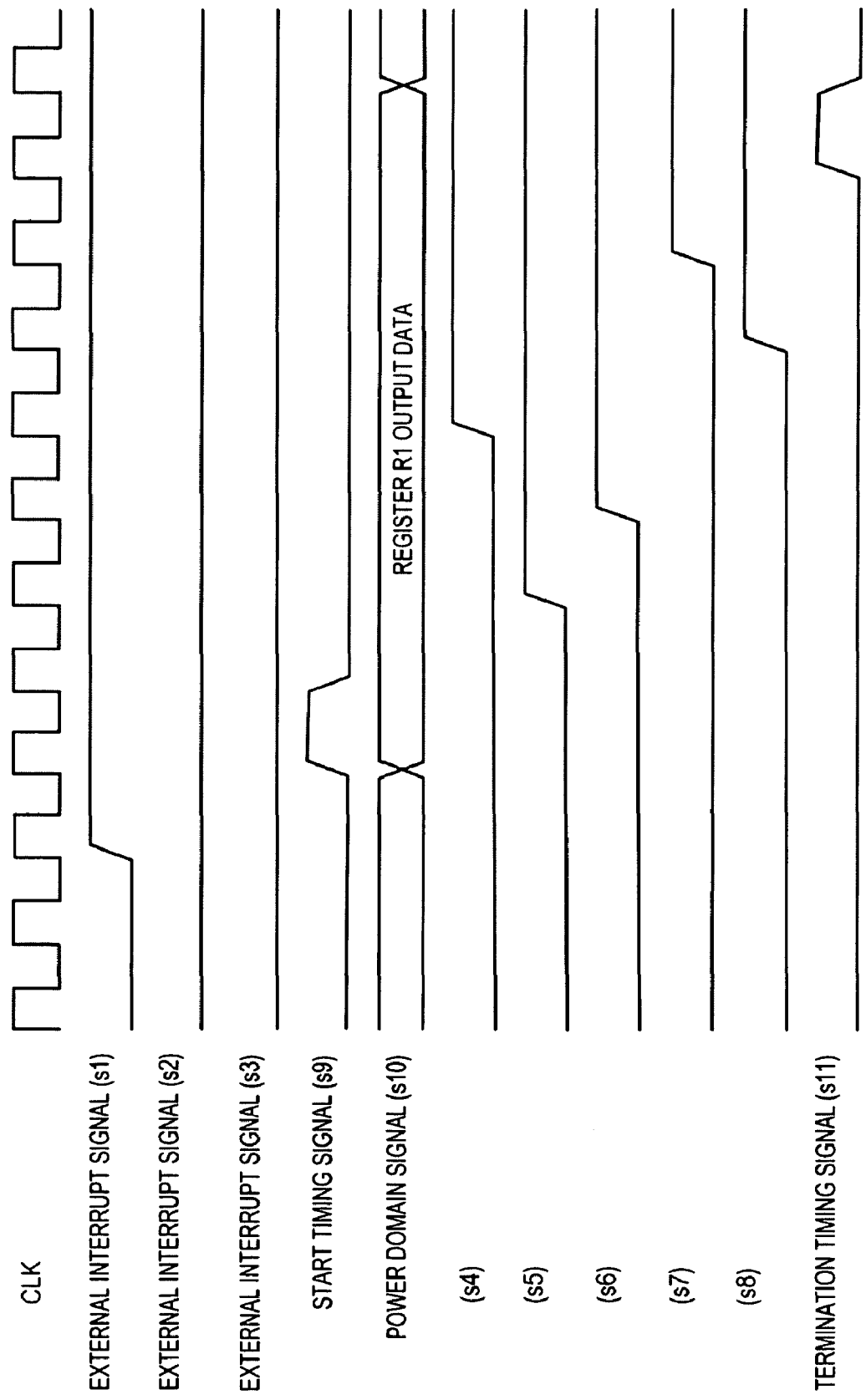
FIG. 11 also is a signal wave diagram of a power-controlling unit PMU for the external interrupt signal s1 according to an example of an embodiment of the present invention.
Figure 12:
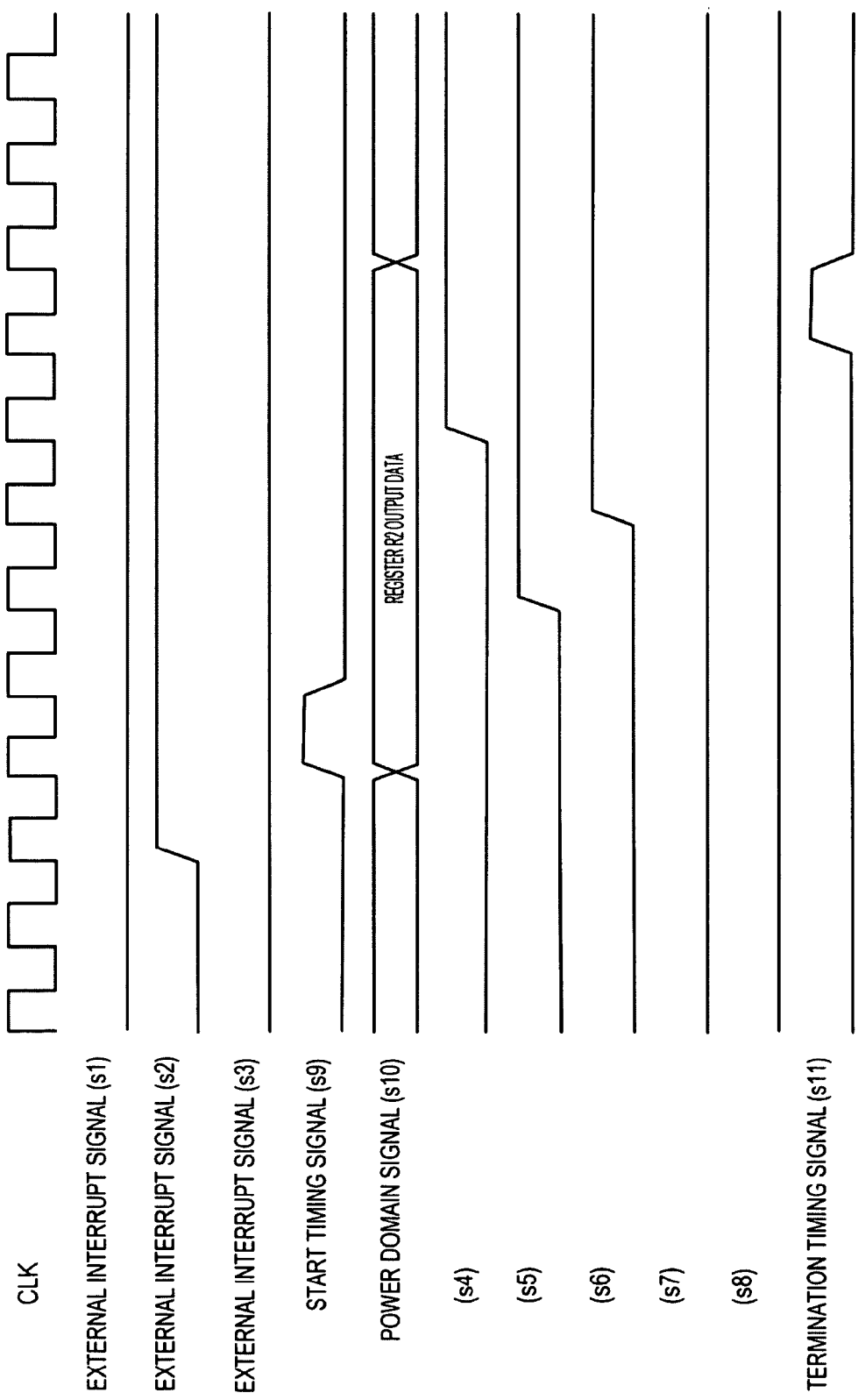
FIG. 12 also is a signal wave diagram of the power-controlling unit PMU for the external interrupt signal s2 according to an example of an embodiment of the present invention.
Figure 13:
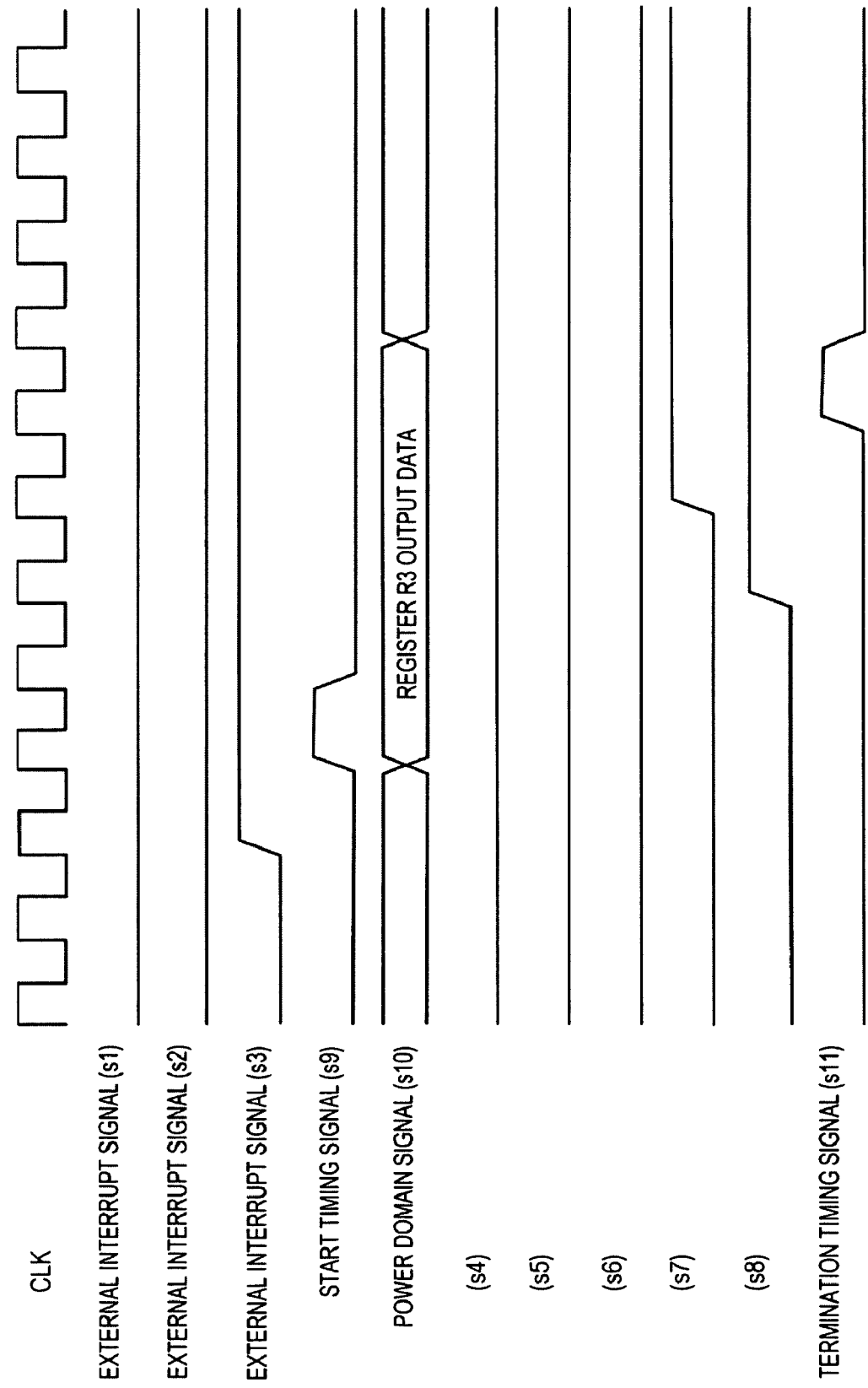
FIG. 13 also is a signal wave diagram of the power-controlling unit PMU for the external interrupt signal s3 according to an example of an embodiment of the present invention.

FIG. 11, FIG. 12, and FIG. 13, are signal wave diagrams of the power-controlling unit PMU for the external interrupt signals s1, s2, and s3. The interrupt process of FIG. 10 will be also described below as referring to FIG. 11, FIG. 12, and FIG. 13.

First, when the external interrupt signal s1 is induced, the interrupt handler 5 in the power-controlling unit 1 reads the power domain data of the power domain register R1, and includes the power domain data to the power domain signal s10 to output the power domain data included in the power domain signal s10 to the power switch controlling unit 6 along with the start timing signal s9. The power switch controlling unit 6 responds to the start timing signal s9 to cause the power switch control signals s4 to s8 to be the H level in the order of the power sequence signal s12. The power switch control signals s4 to s8 turns on the power switches 14 to 18 of the circuit macros 9 to 13 to be activated, included in the power domain signal s10. That is, the power switch control signals become the H level in the order of s5, s6, s4, s8, and s7. Thus, power may be turned on in the order of the communication peripheral circuit 12, and the memory 11, the communication CPU 13, the application peripheral circuit 9, and the application CPU 10 (ST 11 to ST 15). The power switch controlling unit 6 causes power switch control signals to be the H level to output the termination timing signal s11 to the interrupt handler 5, and the interrupt handler 5 terminates the power start control for the external interrupt signal s1.

When all the circuit macros are activated, the initializing processes of such circuit macros are executed (ST 16), and the power-on processes are executed. Such processes to be executed may include, for example, a registering process for registering a position of the portable phone terminal in the communication by the communication CPU with the base station. When a series of processes are completed, the CPUs 10 and 13 output a power block request to the power-controlling unit 1, and the power-controlling unit 1 responds to the power block request to turn off the power switches 14 to 18 of the circuit macros 9 to 13. After that, only the power-controlling unit PMU continues to be supplied with power from the power wiring PWL.

Next, when the external interrupt signal s2 is induced, the interrupt handler 5 in the power-controlling unit 1 reads the power domain data of the power domain register R2, and includes the power domain data to the power domain signal s10 to output the power domain data included in the power domain signal s10 to the power switch controlling unit 6 along with the start timing signal s9. The power switch controlling unit 6 responds to the start timing signal s9 to cause the power switch control signals s6, s5, and s4 to be the H level in the order of the power sequence signal s12. The power switch control signals s6, s5, and s4 turns on the power switches 16, 17, and 18 of the circuit macros 11, 12, and 13 to be activated, included in the power domain signal s10. That is, the power switch control signals become the H level in the order of s5, s6, and s4. Thus, power may be turned on in the order of the communication peripheral circuit 12, and the memory 11, and the communication CPU 13 (ST 19 to ST 21). The power switch controlling unit 6 causes respective power switch control signals to be the H level to output the termination timing signal s11 to the interrupt handler 5, and the interrupt handler 5 terminates the power start control for the external interrupt signal s2.

When the desired circuit macros are activated, the initializing processes of such circuit macros are executed (ST 22), and power-on processes are executed. Such processes to be executed include, for example, the incoming message confirming process by the communication CPU. When a series of processes are completed, the communication CPU 13 outputs a power block request to the power-controlling unit 1, and the power-controlling unit 1 responds to the power block request to turn off the power switches 17 and 18 of the circuit macros 12 and 13. After that, the power-controlling unit PMU continues to be supplied with power from the power wiring PWL.

Finally, when the external interrupt signal s3 is induced, the interrupt handler 5 in the power-controlling unit 1 reads the power domain data of the power domain register R3, and includes the power domain data to the power domain signal s10 to output the power domain data included in the power domain signal s10 to the power switch controlling unit 6 along with the start timing signal s9. The power switch controlling unit 6 responds to the start timing signal s9 to cause the power switch control signals s8 and s7 to be the H level in the order of the power sequence signal s12. The power switch control signals s8 and s7 turns on the power switches 14 and 15 of the circuit macros 9 and 10 to be activated, included in the power domain signal s10. That is, the power switch control signals become the H level in the order of s8 and s7. Thus, power may be turned on in the order of the application peripheral circuit 9 and the application CPU 10 (ST 24 to ST 25). The power switch controlling unit 6 causes the necessary power switch control signals to be the H level to output the termination timing signal s11 to the interrupt handler 5, and the interrupt handler 5 terminates the power start control for the external interrupt signal s3.

When the desired circuit macros are activated, the initializing processes of such circuit macros are executed (ST 26), and power-on processes are executed. Such processes to be executed include, for example, the application process corresponding to the button operated to control. When a series of processes are completed, the application CPU 10 outputs the power block request to the power-controlling unit 1, and the power-controlling unit 1 responds to the power block request to turn off the power switches 14 and 15 of the circuit macros 9 and 10. After that, the power-controlling unit PMU continues to be supplied with power from the power wiring PWL.

FIGS. 14A, 14B and 14C also are detailed configuration diagrams of a power domain register. As different from FIG. 9, in FIG. 14A the power domain register 4 includes sequence registers SR1, SR2, and SR3 corresponding to the external interrupt signals s1, s2, and s3 respectively. The sequence register SR1 stores the power start sequence data for all the circuit macros. The sequence register SR2 stores the power start sequence data for the communication peripheral circuit, the memory, and the communication CPU. The sequence register SR3 stores the power sequence data for the application peripheral circuit and the application CPU. However, the order of the power sequence may be the same as that of FIG. 9.

In FIGS. 14A~14C, the power domain register 4 in the power-controlling unit 1 includes the power domain data indicating the power domain to be activated corresponding to the external interrupt signal, and the power start sequence data. Thus, according to the external interrupt signal, it is possible to activate the power domains of a desired, if not optimum, combination of the circuit macros in a desired, if not optimum, sequence. As a result, it may be possible to reduce the power consumption, and/or to reduce the chances of, if not avoid, the malfunction at the time of the activation. Particularly, since a plurality of the power domains are activated in the order of the start sequence, it is possible to reduce the chances of, if not prevent, a power noise being induced because the instantaneous consumption current is decreased as compared with such a case that a plurality of the power domains are concurrently activated.

At least one embodiment of the present invention may also be embodied as computer readable data including executable instructions that are recorded on a computer readable recording medium. The computer readable recording medium is any data storage device that can store the data, including the executable instructions, and which can be read by a computer system so as to provide the computer system with the executable instructions included in the recorded data for execution. Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion.

Examples of embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made therein without departing from the spirit and scope of the present invention as set forth in the claims.

The invention claimed is:

1. An integrated circuit apparatus, comprising:
   a plurality of power domains to which power voltage is separately supplied;
   a plurality of circuit macros belonging to the plurality of power domains, respectively;
   a plurality of power switches to conduct or to substantially block power coming from a power circuit and going to the plurality of power domains, respectively; and
   a power-controlling unit including the following,
      a controller to control the plurality of power switches,
      a power domain register to store power domain data which corresponds to a plurality of external interrupt signals and indicates power domains that are to be activated; and
      an interrupt handler to respond to the external interrupt signals by delivering the power domain data corresponding to the external interrupt signals to the controller,
      the controller being operable to turn on/off the power switches corresponding to the power domains indicated by the power domain data, respectively,
   wherein the power domain register stores first power domain data corresponding to a first external interrupt signal to indicate a first power domain group, and stores second power domain data corresponding to a second external interrupt signal to indicate a second power domain group, and
      wherein the plurality of circuit macros includes at least a communication CPU and an application CPU,
   the first external interrupt signal is induced in a given cycle, and the controller is operable to turn on the power switch of the power domain of the communication CPU when the first external interrupt signal is induced,
   the second external interrupt signal is induced corresponding to an application processing operation, and the controller is operable to turn on the power switch of the power domain of the application CPU when the second external interrupt signal is induced.

2. The integrated circuit apparatus according to claim 1, wherein
   the power domain register is operable to store third power domain data that corresponds to a third external interrupt signal and indicates all the power domains,
   the controller being operable to turn on the power switches of all the power domains when the third external interrupt signal is induced.

3. The integrated circuit apparatus according to claim 2, wherein
   the power domain to which the power-controlling unit belongs is continually supplied with the power voltage from the power circuit.

4. The integrated circuit apparatus according to claim 2, wherein
   the third external interrupt signal is induced corresponding to a power-on operation, and
   the controller is operable to turn on the power switches of the power domains of the communication CPU and the application CPU when the third external interrupt signal is induced.

5. The integrated circuit apparatus according to claim 2, wherein
   the plurality of circuit macros further includes a communication peripheral circuit and an application peripheral circuit,
   the third external interrupt signal is induced corresponding to a power-on operation, and the controller is operable to turn on the power switches of the power domains of the communication CPU, the communication peripheral circuit, the application CPU, and the application peripheral circuit when the third external interrupt signal is induced,
   the first external interrupt signal is induced in each predetermined cycle, and the controller is operable to turn on the power switches of the power domains of the communication CPU and the communication peripheral circuit when the first external interrupt signal is induced,
   the second external interrupt signal is induced corresponding to an application processing operation, and the controller is operable to turn on the power switches of the power domains of the application CPU and the application peripheral circuit when the second external interrupt signal is induced.

6. The integrated circuit apparatus according to claim 1, wherein
   the power domain register stores start sequence data including a start order of the plurality of power domains, and
   the controller is operable to turn on the power switches according to the start order of the start sequence data when a corresponding external interrupt signal is received.

7. A method of managing power supplied to a plurality of power domains that include a plurality of circuit macros, respectively, there being a plurality of power switches to conduct or to substantially block power coming from a power circuit and going to the plurality power domains, respectively, the method comprising:
   receiving one of a plurality of possible external interrupt signals that are indicative of power domains that are to be activated;
   retrieving, from a memory, power domain data corresponding to the external interrupt signal;
   storing, in a power domain register, power domain data which corresponds to a plurality of external interrupt signals and indicates power domains that are to be activated; and
   selectively turning on/off the power switches corresponding to the power domains indicated by the power domain data, respectively, wherein the power domain register stores first power domain data corresponding to a first external interrupt signal to indicate a first power domain group, and stores second power domain data corresponding to a second external interrupt signal to indicate a second power domain group, and wherein the plurality of circuit macros includes at least a communication CPU and an application CPU, the first external interrupt signal is induced in a given cycle, and the controller is operable to turn on the power switch of the power domain of the communication CPU when the first external interrupt signal is induced, the second external interrupt signal is induced corresponding to an application processing operation, and the controller is operable to turn on the power switch of the power domain of the application CPU when the second external interrupt signal is induced.

8. The method according to claim 7, wherein
the storing stores third power domain data that corresponds to a third external interrupt signal and indicates all the power domains,
the selectively turning includes turning on the power switches of all the power domains when the third external interrupt signal is received.

9. The method according to claim 8, further comprising:
supply power continually to the power domain to which the power-controlling unit belongs.

10. The method according to claim 8, wherein
a third external interrupt signal corresponds to a power-on operation, and
the selectively turning includes turning on the power switches of the power domains of the communication CPU and the application CPU when the third external interrupt signal is received.

11. The method according to claim 8, wherein
the plurality of circuit macros further includes a communication peripheral circuit and an application peripheral circuit,
the third external interrupt signal is received in correspondence to a power-on operation, and the selectively turning includes turning on the power switches of the power domains of the communication CPU, the communication peripheral circuit, the application CPU, and the application peripheral circuit when the third external interrupt signal is received,
the first external interrupt signal is received in a given cycle, and the selectively turning includes turning on the power switches of the power domains of the communication CPU and the communication peripheral circuit when the first external interrupt signal is received,
the second external interrupt signal is received in correspondence to an application processing operation, and the selectively turning includes turning on the power switches of the power domains of the application CPU and the application peripheral circuit when the second external interrupt signal is received.

12. The method according to claim 7, wherein
the memory stores start sequence data including a start order of a plurality of the power domains,
the selectively turning includes selectively turning on the power switches in the start order of the start sequence data when a corresponding external interrupt signal is received.

* * * * *